United States Patent
Abouchakra et al.

(10) Patent No.: US 6,819,685 B1
(45) Date of Patent: Nov. 16, 2004

(54) METHOD OF AND SYSTEM FOR CONTROLLING A FREQUENCY VIA AN ASYNCHRONOUS TRANSMISSION NETWORK AND MOBILE TELEPHONE NETWORK INCLUDING THE SYSTEM

(75) Inventors: Rabih Abouchakra, Cormeilles en Parisis (FR); Henri Symolon, Ezanville (FR); Gérard Vergnaud, Franconville (FR); Raphaël Roux, deceased, late of Argenteuil (FR), Josette Roux, legal representative

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/443,463

(22) Filed: Nov. 19, 1999

(30) Foreign Application Priority Data

Dec. 3, 1998 (FR) .............................................. 98 15273

(51) Int. Cl.[7] .............................. H04J 3/06; H04L 12/28
(52) U.S. Cl. ................... 370/519; 370/310; 370/395.64
(58) Field of Search ................................ 370/503, 516, 370/517, 519, 395.62, 394, 508, 350

(56) References Cited

U.S. PATENT DOCUMENTS

| | | | | |
|---|---|---|---|---|
| 5,396,492 A | * | 3/1995 | Lien ............................ | 370/412 |
| 5,450,394 A | * | 9/1995 | Gruber et al. .............. | 370/253 |
| 5,608,731 A | * | 3/1997 | Upp et al. ............. | 370/395.62 |
| 5,742,594 A | * | 4/1998 | Natarajan .................... | 370/336 |
| 6,026,074 A | * | 2/2000 | Stadler et al. .............. | 370/503 |
| 6,167,048 A | * | 12/2000 | Law et al. ............. | 370/395.62 |
| 6,262,999 B1 | * | 7/2001 | Fournier ..................... | 370/516 |

OTHER PUBLICATIONS

Ahmed, H. M.: "Adaptive Terminal Synchronization in Packet Data Networks" Communications Technology for the 1990's and beyond, Dallas, Nov. 27–30, 1989, col. 2, Nov. 27, 1989, pp. 728–732, XP000091166 Institute of Electrical and Electronics Engineers.

Montgomery, W. A.: "Techniques for Packet Voice Synchronization" IEEE Journal on Selected Areas in Communications, vol. SAC–01, No. 6, Dec. 1, 1993, pp. 1022–1028, XP000563228.

Wang, C–J. et al.: A Multimedia Synchronization Protocol for ATM Networks Proceedings of the International Conference on Distributed Computing Systems, Poznan, Poland, Jun. 21–24, 1994 No. Conf. 14, Jun. 21, 1994, pp. 476–483, XP000489110 Institute of Electrical And Electronics Engineers ISBN: 0–8186–5842–8.

* cited by examiner

*Primary Examiner*—Charles N. Appiah
(74) *Attorney, Agent, or Firm*—Sughrue Mion, PLLC

(57) ABSTRACT

In a method of controlling a frequency via an asynchronous transmission network, signals received at the output of the asynchronous transmission network have been clocked at a reference frequency and transmitted by the network with respective varying transit delays and the frequency of a local clock is slaved to the reference frequency by means of an error signal formed from selected received signals with minimal transit delays. Applications include local mobile telephone networks.

11 Claims, 3 Drawing Sheets

METHOD OF AND SYSTEM FOR CONTROLLING A FREQUENCY VIA AN ASYNCHRONOUS TRANSMISSION NETWORK AND MOBILE TELEPHONE NETWORK INCLUDING THE SYSTEM

BACKGROUND OF THE INVENTION

1. Field of the invention

The present invention finds an application in telecommunications and in particular in a mobile telephone network.

2. Description of the prior art

In a mobile telephone network the clocks of the various base transceiver stations must be synchronized and it is often necessary to provide means for keeping them synchronized despite the tendency of the clock frequency to drift with time. The invention applies, with advantage in the situation where the stations exchange information in the form of packets transmitted via an asynchronous transmission network. In the context of calls set up between network subscribers, the information is the human voice or data, for example. A station generally sends the packets at constant intervals. The asynchronous network imposes transit delays on them, however, and these delays are subject to random fluctuations.

One method of securing phase agreement is the Synchronous Residual Time Stamp (SRTS) method. It uses a reference clock whose signals are received by the base transceiver stations via transmission means imposing constant transit delays on the signals. It has the disadvantage that the aforementioned means must connect the clock to all the stations, which makes it costly to implement.

This is why a second prior art method has been defined to maintain phase agreement once it has been established. This method has the advantage of using only the asynchronous network for this purpose, which has to be used in any case to transmit the packets conveying information. It has the further advantage that the packets are the only signals injected into the network. This process is referred to as "adaptive synchronization". In substance, it continuously accumulates the intervals between the packets received at the output of the asynchronous network and compares the result with the sum of the same number of theoretical intervals defined by a local clock. The result of this comparison constitutes an error signal, i.e. a signal that is used to define any increase required in the clock frequency, variation of the signal modifying the clock frequency and variation of the clock frequency modifying the signal by means of a feedback loop. This method therefore slaves the frequency to that of a reference clock which times transmission of packets. Any slow drift of the reference clock frequency affects the local clock. The method has the disadvantage that the local clock frequency is subject to low-frequency jitter referred to as "wonder".

The above first and second prior art methods are described in more detail in the ITU-T standard 1.363.1, in paragraphs 2.5.2.2.2 and 2.5.2.2.1, respectively.

The present invention concerns adjusting the frequency of a local clock on the basis of that of a reference clock via an asynchronous transmission network and one object of the present invention is to achieve this by means of fast, accurate and stable (i.e. jitter-free) control at limited cost.

SUMMARY OF THE INVENTION

To this end, the present invention consists in a method of controlling a frequency via an asynchronous transmission network, in which method signals received at the output of the asynchronous transmission network have been clocked at a reference frequency and transmitted by the network with respective varying transit delays and the frequency of a local clock is slaved to the reference frequency by means of an error signal formed from selected received signals with minimal transit delays.

In the description of this invention a signal is referred to as "fast" and its transit delay is referred to as "minimum" if the delay is the shortest or practically the shortest of the transit delays of the signals received at the output of the asynchronous network during a period including reception of the fast signal. Several such periods can be defined and a minimum transit delay con be found in each period. Such periods are referred to hereinafter as "search periods".

The error signal is typically formed from respective time offsets associated with the received signals. Each offset occurs between two corresponding instants, one of which belongs to a received series made up of instants respectively marked by said received signals and the other to a theoretical series defined by said local clock, this instant from the received sequence being the one marked by the signal associated with the offset.

In the received sequence, the marked instants form a succession at partly random intervals. However, they typically formed a succession at a constant interval in the sequence that the signals formed when they were transmitted, the interval being defined on the basis of the reference frequency. The theoretical sequence defined by the local clock then also has constant intervals if the frequency of the clock is itself constant.

Various means can be employed to select the fast signals. For example, each signal can have a time stamp indicating the time at which it was injected into the transmission network, and that time is compared with the time defined by the local clock for the reception of that signal and this comparison provides a basis for selecting the fast signals, at least approximately. However, this has the disadvantage that adding the time stamps increases the cost of the method. This is why, in the context of the present invention, a received signal is preferably selected as a fast signal when the offset associated with that signal has a minimum value in a group of such offsets. The group is formed by the offsets which are associated at the instants in the received sequence which are within one of the search periods mentioned above.

The invention is described in more detail hereinafter with reference to the accompanying diagrammatic drawings, with an indication, by way of example, of how it can be put into effect.

DETAILED DESCRIPTION OF THE PREFERRED EMBODIMENT

Figure 1:
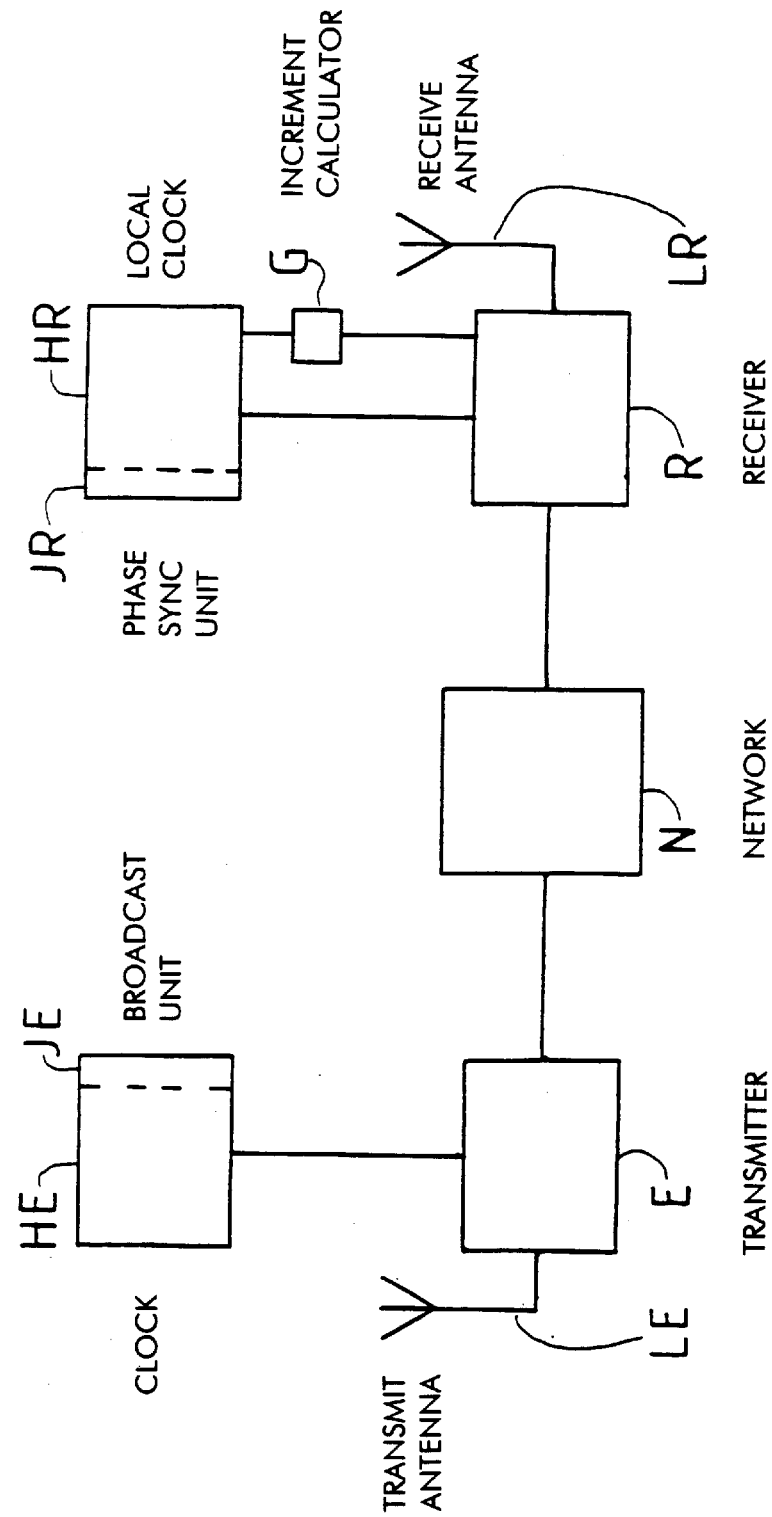
FIG. 1 shows part of a mobile telephone network implementing the invention.
Figure 2:
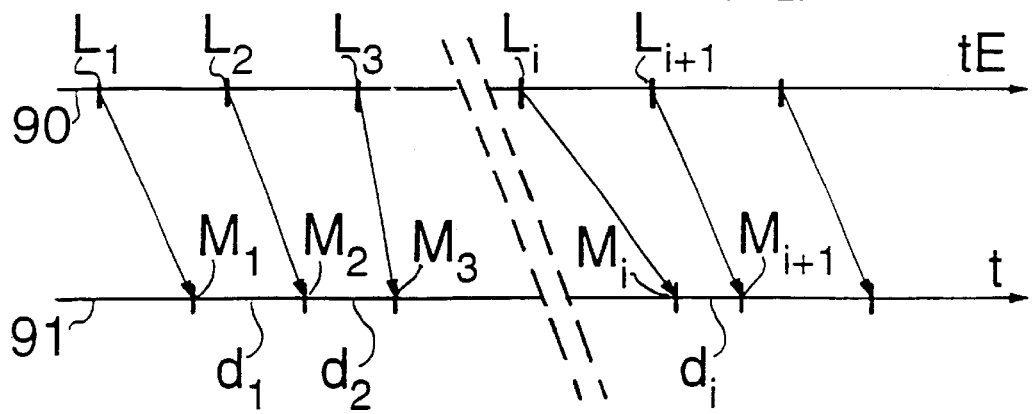
FIG. 2 is a timing diagram showing transit of signals between a transmitter and a receiver of the network shown in FIG. 1.

The method of this invention and the second prior art method mentioned above both comprise, in substance, the following steps:

A step of sending a series of signals respectively marking instants, said sequence, said signals and said instants respectively constituting a transmitted sequence visible on the axis 90 in FIG. 2, locking signals, not shown, and marked instants $L_1 \ldots L_i$. Said marked instants are separated in said transmitted, sequence by successive intervals having the same value constituting a reference interval. The transmitter unit E which sent the signals is shown in FIG. 1. It is clocked by a reference clock HE and the reference interval is equal to a predetermined number of periods of the reference clock. The frequency F of the reference clock is the reference frequency mentioned above. It is typically constant. However, the invention would still be of benefit if this frequency were modified. The time tE plotted in the axis 90 is the time defined by the reference clock.

A step of injecting the transmitted sequence into the previously mentioned asynchronous transmission network N.

A step in which a receiver R at the output of the network at a distance from the transmitter E receives the locking signals. These signals form for said receiver a sequence constituting the received sequence previously referred to, the instants marked by these signals constituting in said sequence receive instants $M_1 \ldots M_i$ respectively corresponding to the instants $L_1 \ldots L_i$.

In the context of a telephone system, packets conveying information are typically transmitted by the network N from the transmitter E to the receiver R to constitute a call. In this case, the locking signals can advantageously be the packets, the instant marked by a packet being a start defined by a header of the packet, for example. The above transmission, injection and reception steps are then necessary for making calls and their use in the frequency control process does not necessitate any modification of the telephone system.

Receive intervals $d_1 \ldots d_i$ appear in the received sequence. Each of them, such as interval $d_1$, has a start, such as $M_1$, consisting of one of the receive instants, and an end, such as $M_2$, which is the instant in the sequence following the start. The receive instants are marked on the axis 91 in FIGS. 2 and 3. The receive intervals are different because the transmission network subjects the locking signals to transit delays that vary randomly from one signal to another, although each delay is at least equal to a base delay which is imposed by the structure of the network and by the positions of the transmitter and the receiver relative thereto.

Figure 3:
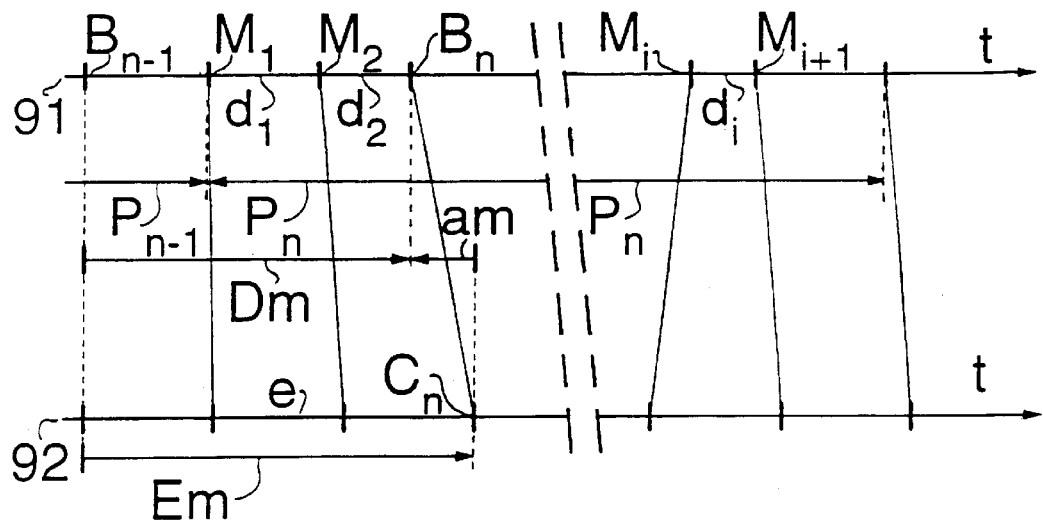
FIG. 3 is a timing diagram showing a time comparison carried out in the above receiver.

The receiver R is clocked by the local clock HR mentioned above. The clock frequency can be adjusted and the clock period is defined by the frequency. The time t plotted on the horizontal axes in FIG. 3 is that defined by this clock.

A step of choosing a theoretical interval "e" defined relative to the period of said local clock. At the beginning of the process, this interval is typically chosen so that its duration is as close as possible to that of the reference interval. This takes account of the approximately known values of the reference clock frequency and the local clock frequency.

Successively using said local clock to provide a measurement value for each of said receive intervals, said value constituting a measured interval ending at said end of said interval. This use of the local clock means that the measured interval is both representative of the duration of the receive interval and proportional to the frequency of that clock.

Defining a plurality of calculation ranges each having a start and an end consisting of respective receive instants.

Finally, steps performed for each of the calculation ranges. These steps are typically executed in the receiver and include at least the following steps:

A step of adding the measured intervals terminating in said range. The result of this addition constitutes a cumulative measured interval D of said range and the number of said intervals constitutes a number of intervals of said range.

A step of multiplying the theoretical interval by the number of intervals of the range. The result of this multiplication constitutes a cumulative theoretical interval E of said range.

Finally, a step of calculating an offset "a" of said range. The offset has an algebraic value equal to the cumulative measured interval of said range less said cumulative theoretical interval of said range. It constitutes one of the offsets mentioned above occurring between two instants of which one belongs to the received sequence and the other to a theoretical sequence. The instants of the theoretical sequence are marked on the axis 92 in FIG. 3. They are each separated from the beginning of the range by an integer number of theoretical intervals, this number being that of the intervals of that range in the case of the instant $C_n$ considered for calculating the offset.

The method further includes action steps for adjusting the frequency of said local clock, each of said steps constituting a terminal step of an adjustment sequence also including an adjustment group of said step, said group including at least one of said calculation ranges. The calculation ranges of said group respectively constitute adjustment ranges and a cumulative offset A of said group comprises the algebraic sum of the offsets of said adjustment ranges. An action of said step modifies the frequency of the local clock up or down according to whether the cumulative offset of said group is respectively negative or positive, so that said cumulative offset constitutes an error signal as mentioned above.

The performing of this action and the amplitude of this modification typically depend on earlier adjustment steps and on the absolute value of the cumulative offset in particular to achieve stable and preferably fast and accurate slaving of the theoretical interval to the reference interval. The slaving referred to here is the previously mentioned slaving of the local clock frequency to the reference clock frequency, or to that frequency multiplied by a known predetermined number. Its stability, speed and accuracy depend in particular on the choice of adjustment ranges.

If the prior art adaptive synchronization method is described using the same terminology as employed above, it is clear that the calculation ranges of the prior art method have a common start and that each constitutes an adjustment range. The start is in an initial phase of the process and is determined by the initial instant of the process. Each receive instant after the start then constitutes the end of a range and so each range merely adds one interval to a preceding range.

The method of the present invention is distinguished from the prior art method by the following points in particular:

It includes a step of choosing a succession of search periods, such as the periods $P_{n-1}$ and $P_n$ shown in FIG. 3, each of these periods having a start and an end separated by a chosen number of theoretical intervals. This number is greater than three and constitutes a duration "k" of the period. The period includes a succession of receive instants.

It also includes search steps respectively executed for said search periods and each including the following steps:

A step of choosing a search origin consisting of an instant not posterior to said start of said period.

For each receive instant of said period, a step of calculating an offset associated with said instant. This offset is the offset of a calculation range having a start consisting of said search origin and an end consisting of said instant.

Finally, a step of defining an adjustment limit, such as the limit $B_n$. This limit is one of the receive instants of sold period. It is such that the offset "am" associated with said limit is the smallest of the offsets associated with said instants. It constitutes a minimal offset instant of that period. The way it is defined means that the locking signal which marks it in the received sequence is one of the fast signals mentioned above. To be more precise, the transit delay of the signal is the shortest delay of the period.

According to the invention, the starts and the ends of the adjustment ranges then consist only of adjustment limits as defined above. For example, the limits $B_{n-1}$ and $B_n$ limit a range of duration Dm.

Figure 5:
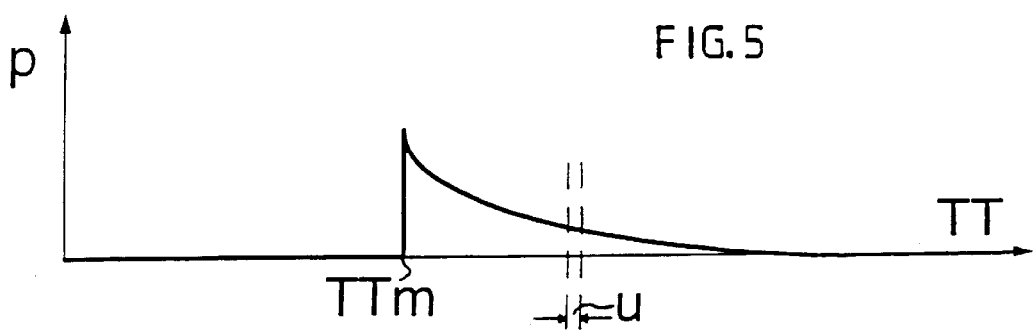
FIG. 5 is a diagram showing the probability density of the occurrence of each possible value of the transit delay of a signal in an asynchronous transmission network.

This selection of the calculation ranges used to form the error signal has the advantage of eliminating, or at least strongly reducing, frequency fluctuations that can result from certain variations in the transit delays imposed on the successive locking signals. This advantage is the result of the selective use of fast signals to determine the limits of the ranges. It relates to a fact that has been recognized and exploited in the context of this invention and which manifests itself if the above search periods are sufficiently long. The fact referred to is that the difference between the transit delays of two signals chosen at random is then much smaller, on average, when the two signals are chosen from the fast signals than if they are chosen from all the transmitted signals. This reduction in the average difference between the transit delays is related to the fact that, when the number of signals transmitted is high, the number of transit delays encountered in an interval of given width such as "u" in FIG. 5 increases as that interval approaches the base delay TTm mentioned above, this number being indicated by the probability density p that a transit delay has the value TT.

The start such as the start $M_1$ of each period such as the period $P_n$ in the succession of search periods is preferably the end of the preceding period $P_{n-1}$.

The search origin of each search period constituting a period $P_n$ in question is preferably the adjustment limit $B_{n-1}$ of a search period $P_{n-1}$ preceding the period in question in the succession of search periods. The start and end of an adjustment range then respectively comprise the two adjustment limits $B_{n-1}$ and $B_n$ of the two periods.

The duration "k" of the successive search periods is matched to the traffic of the network N. It can be constant. It can nevertheless advantageously be increased when it is apparent that the network N is approaching a state of overload, because it is preferable for a locking signal to be selected only if its transit delay is only slightly greater than the base delay. A signal having a transit delay of this kind is referred to hereinafter as "sufficiently fast". The above advantage then results from the fact that on approaching the state of overload the transit delays tend to diverge from the base delay TTm. Increasing the duration "k" then enables a sufficiently fast signal to be found in each search period, despite the reduction in the proportion of such signals in the set of all locking signals. If the load on the network N decreases later, the duration "k" is then brought back to a base value to prevent unnecessary lengthening of the lock-on delay needed to bring the local clock frequency into the vicinity of the reference frequency.

The frequency of the local clock could be modified after each adjustment range, the range then itself constituting an adjustment group.

However, the ranges of each adjustment group preferably form a succession of ranges, the adjustment sequence including the calculation of a cumulative offset A for each adjustment range of the group, such as the range Dm. The cumulative offset of the first range of the succession is the offset "am" of that range and the cumulative offset of each of the subsequent ranges is the algebraic sum of the offsets "am" of the next range and the ranges preceding it. An error signal of the process then consists of the cumulative offset of a range of the group.

The adjustment sequences preferably also form a succession. The process then further includes a step of defining a tolerated offset domain between a positive offset threshold and a negative offset threshold which typically have the same absolute value S. It further includes a step of defining a succession of respective frequency increments f for the adjustment sequences. The frequency modification mentioned above for each adjustment sequence is then performed only when the cumulative offset A of a range of the adjustment group of the sequence leaves the tolerated offset domain, this modification having an amplitude equal to the frequency increment defined for that sequence. The range then constitutes a last range of the adjustment group. The magnitude and the evolution of the frequency increment are determined to ensure that control is stable, fast and accurate.

The difference between the frequency of the local clock and the reference frequency can be large in an initial phase of the control process. To accelerate the process, the increment "f" then preferably has a high value relative to a base increment "h" and increases until crossing of the reference frequency is detected. Each time this crossing is detected, the increment is decreased so that it is progressively reduced to the base increment to ensure that control is stable. If a new frequency difference manifests itself, the increment initially remains constant through a particular number of adjustment groups imparting the same sense of change to the frequency F, after which it increases from a value equal to the base increment multiplied by that same number, until a new crossing is detected.

Figure 4:
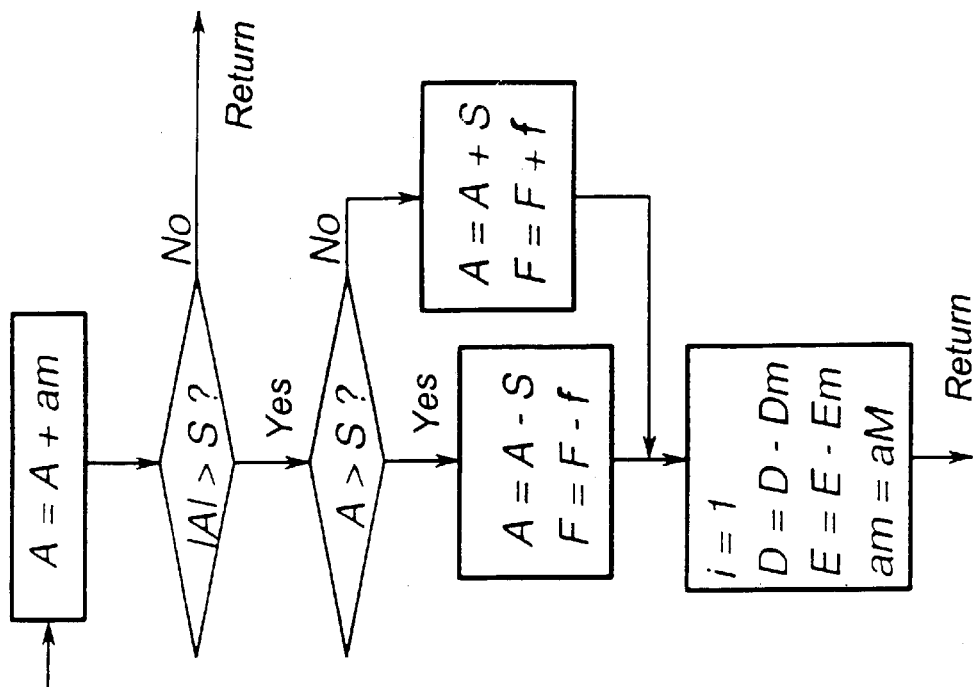
FIG. 4 shows an algorithm executed in the receiver.
Figure 4:
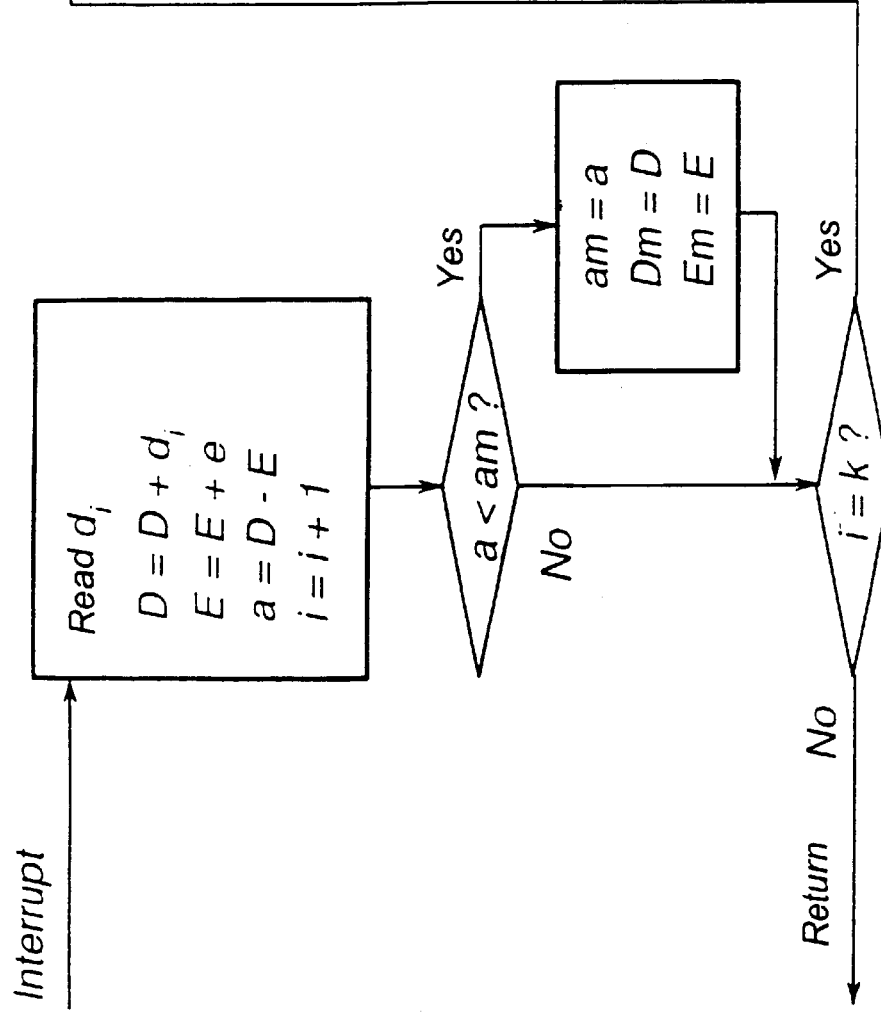

Another object of the present invention is a system for controlling a frequency via an asynchronous transmission network. The system uses the method of the invention. To this end it includes the receiver R and the local clock HR and the receiver includes a control program in substance for executing the instructions summarized in the algorithm shown in FIG. 4.

Those instructions are executed at each receive instant, the signals which mark those instants being received at an "interrupt" input. They are as follows:

reading the interval $d_i$ between the receive instant $M_{i+1}$ and the receive instant $M_i$ preceding the instant in the received sequence, i being an index equal to 1 for the first receive instant after the start of each search period, calculating $D=D+d_n$, D being the cumulative measured interval of a calculation range within the period, calculating $E=E+e$, E being the cumulative theoretical interval and e being the theoretical interval, calculating $a=D-E$, a being the offset of the range, calculating $i=i+1$, answering the question a<am?, where am is a parameter that evolves until it is representative of the offset associated with a calculation limit, if the response to the preceding question is "yes":

setting am=a, setting Dm=D, Dm being defined by subsequent instructions, setting Em=E, regardless of the answer to the preceding question, answering the question k?k?,k being the duration of the search period, if the answer to the preceding question is "no": waiting for the next receive instant, (this instruction is labelled "return" in the figure)

if the answer to the preceding question is "yes" and if an action conforms to the program, then performing that action, setting i=1, calculating D=D−Dm, calculating E=E−Em, setting am=aM, aM being a predetermined parameter at least equal to the largest value foreseeable for an offset associated with a receive instant, and waiting for the next receive instant.

The system preferably further includes an increment calculating unit G for calculating the frequency increment f. This unit is informed by the receiver R and informs the local clock HR. The above instruction to perform an action then includes the following instructions:

calculate A=A+am, A being a variable parameter having a zero value when the system is commissioned, answer the question IAI>S?, S being an absolute value common to the positive and negative offset thresholds, if the answer to the preceding question is "no": wait for the next receive instant, if the answer to the preceding question is "yes": answer the question A>S?, if the response to the preceding question is "no": calculate A=A+S, make the modification F=F+f, F being the frequency of the local clock and f being the frequency increment, each of the modifications being effected by control of the clock by the receiver R with the aid of the increment calculating unit G, inform the unit G of the preceding modification, (the instructions to inform the unit are not shown)

if the answer to the preceding question is "yes": calculate A=A−S, effect one of the modifications F=F−f, and inform the unit G of the preceding modification.

The local clock HR preferably includes a phase synchronization unit JR programmed to bring about provisional phase agreement of the local clock with a timebase external to the system by exchanging synchronization signals with the timebase. The exchange is via transmission means imposing constant transit delays on the signals. The system of the present invention then constitutes a synchronization system that can achieve long-lasting phase agreement by the frequency control process described above.

The timebase is the clock HE of the transmitter E, for example, that clock being provided with a broadcast unit JE communicating with the unit JR. The transmission means comprise a radio channel, for example. The units JR and JE achieve an initial phase agreement between the clocks HE and HR. To do this they use antennas LE and LR respectively belonging to the transmitter E and to the receiver R. The frequency control process then maintains the phase agreement with an acceptable accuracy at least during a period after which these units again achieve an in-phase relationship. The control process can make this period very long. This avoids congestion on the radio channel.

The sequence of exchange of synchronization signals between the units JE and JR can be analogous to that of the NTP protocol described in publications RFC 1305 and RFC 1361. A sequence of this kind will be described, on the understanding that each signal transmit or receive instant is defined by the clock of the unit which transmits or receives the signal: at time $H_0$ (not shown) the unit JE sends a first signal with a time stamp indicating that time. At time $H_1$ the unit JR receives that signal and at time $H_2$ it transmits a second signal with time stamps indicating the times $H_0$, $H_1$ and $H_2$. At time $H_3$ the unit JE receives this second signal and at time $H_4$ it transmits a third signal with time stamps $H_0$, $H_1$, $H_2$, $H_3$ and $H_4$ and an element indicating the value of a round trip delay $RTD=H_1-H_2+H_3-H_0$. At the time at which the unit JR receives this third signal it adjusts the local clock HR so that for this instant it indicates the time $H_4+\frac{1}{2}$ RTD.

The invention also consists in a mobile telephone network including a plurality of base transceiver stations interconnected by an asynchronous transmission network N. The network is characterized in that at least one base transceiver station constitutes a system as described hereinabove. The transmitter E and the receiver R described above are each typically one of the base transceiver stations. The antennas LE and LR enable the transmitter and the receiver to communicate with the mobile terminals of the network.

In a network of the above kind, each of the base transceiver stations constituting a receiver such as a receiver R processes many calls, i.e. receives, processes and transmits various packets, the processing operations including modification, routing, etc. The receiver therefore includes a program referred to hereinafter as the main program for performing those operations. Each time a packet arrives, the main program is interrupted in order to execute the control program mentioned above. This is why the point of arrival of such packets is labeled "interrupt" in FIG. 4. The label "return" designates a return to the main program pending the arrival of the next packet.

Advantages of the invention are apparent in the situation where the base transceiver stations of a network of the above kind are relatively close together so that the radio transmission times between the mobile terminals of the users and the base transceiver stations are near enough negligible. This is the case with a digital European cordless telephone (DECT) local mobile telephone network in which the distances between stations are often in the range from 20 m to 500 m and each station has a frame synchronization clock controlled by a 100 Hz clock such as HE and HR. The phases of the frame synchronization clocks must then be kept in agreement to enable handover of a call between two base transceiver stations as one user participating in a call moves around. The invention facilitates handover.

Some of the parameters mentioned above con hove the following values and/or values in the following ranges, for example:

search period duration k: from 10 to 10,000, a typical value being 250, clock frequency: typically 16,384 kHz, base delay TTm for transit of a packet in the network N: less than 100 ms, theoretical interval "e": from 1 ms to 100 ms, a typical value being 8 ms, offset threshold S: from 3,200 ns to 32,000 ns, a typical value being 12,800 ns, base frequency increment h: typical value 0.28 Hz.

In the presence of an initial frequency difference of as much as several Hertz between two clocks such as HE and HR, the invention can stabilize the frequency within a lock-on delay close to one or two minutes. The required equality of the two frequencies is then achieved with an accuracy such that the time difference between the two frame synchronization clocks can be maintained below 4,000 ns for a holding time of two to three minutes. For quasi-periodic frame agreement operations, a delay of this magnitude means that it is easy to find available time slots between two telephone calls in a radio channel provided for such operations.

What is claimed is:

1. A method of controlling a frequency via an asynchronous transmission network, in which method signals received at the output of said asynchronous transmission network have been clocked at a reference frequency and transmitted by said network with respective varying transit delays and the frequency of a local clock is slaved to said reference frequency by means of an error signal formed from selected received signals with minimal transit delays;

wherein said error signal is formed from respective time offsets associated with said received signals, each of said offsets occurs between two instants in corresponding relationship, one of which belongs to a received sequence formed of instants respectively marked by said received signals and the other to a theoretical sequence defined by said local clock, said instant of said received sequence is marked by said signal associated with said offset, and a received signal constitutes a selected signal when said offset associated with said received signal is the minimum offset of the offsets associated with a group of consecutive instants of said received sequence; and wherein said method further includes the following steps:

sending a series of signals marking respective instants, said sequence, said signals and said instants respectively constituting a transmitted sequence, locking signals and marked instants, said marked instants being separated in said transmitted sequence by successive intervals having the same value constituting a reference interval, injecting said transmitted sequence into said asynchronous transmission network, a receiver at the output of said transmission network receiving said locking signals which form for said receiver a sequence constituting said receive sequence previously referred to, said instants marked by said signals in said sequence constituting receive instants respectively corresponding to said instants marked by said signals in said transmitted sequence, receive intervals being present in said receive sequence and each having a start consisting of one of said receive instants and an end consisting of the instant that follows said start in said sequence, choosing a theoretical interval "e" defined relative to the period of said local clock, successively using said local clock to provide a measurement value for each of said receive intervals, said value constituting a measured interval ending at said end of said interval, defining a plurality of calculation ranges each having a start and an end consisting of respective receive instants, and at least the following steps performed for each of said calculation ranges:

adding said measured intervals terminating in said range, the result of such addition constituting a cumulative measured interval of said range, the number of said intervals constituting a number of intervals of said range, multiplying said theoretical interval by said number of intervals of said range, the result of said multiplication constituting a cumulative theoretical interval of said range, and calculating an offset of said range having an algebraic value equal to said cumulative measured interval of said range less said cumulative theoretical interval of said range, said method further including action steps for adjusting the frequency of said local clock, each of said steps constituting a terminal step of an adjustment sequence also including an adjustment group of said step, said group including at least one of said calculation ranges, said calculation ranges of said group respectively constituting adjustment ranges, a cumulative offset of said group comprising the algebraic sum of said offsets of said adjustment ranges, an action of said step modifying the frequency of said clock up or down according to whether said cumulative offset of said group is respectively negative or positive, so that said cumulative offset constitutes an error signal, and said method further including the following steps:

choosing a succession of search periods each having a start and an end separated by a chosen number of said theoretical intervals, said number being greater than three and constituting a duration of said period, said period including a succession of said receive instants, and search steps respectively executed for said search periods and each including the following steps:

choosing a search origin consisting of an instant not posterior to said start of said period, for each of said receive instants of said period, calculating an offset associated with said instant, said offset being said offset of one of said calculation ranges having a start consisting of said search origin and an end consisting of said instant, and defining an adjustment limit, said limit being one of said receive instants of said period and such that said offset associated with said limit is the smallest of said offsets associated with said instants, said starts and ends of said adjustment ranges being said adjustment limits.

2. The method claimed in claim 1 wherein said start of each period in said succession of search periods is said end of the preceding period.

3. The method claimed in claim 2 wherein said search origin of each search period constituting a period in question is said adjustment limit of a search period preceding said period in question in said succession of search periods and the start and end of an adjustment range respectively comprise said two adjustment limits of said two periods.

4. The method claimed in claim 3 wherein said duration of said search periods is from 10 to 10,000.

5. The method claimed in claim 1 wherein said adjustment ranges of each adjustment group form a succession of ranges including a first range and subsequent ranges, said adjustment sequence includes, for each adjustment range of said group, the calculation of a cumulative offset of said range, said cumulative offset of said first range is said offset of said range, said cumulative offset of each of said subsequent ranges is the algebraic sum of said offsets of said subsequent range and the ranges preceding said subsequent range in said succession of ranges, and an error signal consists of said cumulative offset of a range of said succession.

6. The method claimed in claim 5 wherein said adjustment sequences form a succession of sequences, and further including the steps of:

defining a tolerated offset domain between a positive offset threshold and a negative offset threshold, and defining a succession of respective frequency increments for said adjustment sequences, said frequency modification of each of said adjustment sequences being performed only when said cumulative adjustment of a range of said adjustment group of said sequence leaves said tolerated offset domain, said modification having an amplitude equal to said frequency increment defined for said sequence, said range then constituting a last range of said adjustment group.

7. A system for controlling a frequency via an asynchronous transmission network using a method as claimed in claim 6 and to this end including a receiver and a local clock.

8. The system claimed in claim 7, wherein said receiver includes a control program for executing the following instructions at each of said receive instants:

reading the interval di between said receive instant $M_{i+1}$ and the receive instant $M_i$ preceding said instant in said received sequence, i being an index equal to 1 for the first receive instant after the start of each search period, calculating D=D+di, D being said cumulative measured interval of a calculation range within said period, calculating E=E+e, E being said cumulative theoretical interval and e being said theoretical interval, calculating a=D−E, a being said offset of said range, calculating i=i+1, answering the question a<am?, where am is a parameter that evolves until it is representative of said offset associated with a calculation limit, if the response to the preceding question is "yes":

setting am=a, setting Dm=D, Dm being defined by subsequent instructions, setting Em=E, regardless of the answer to the preceding question, answering the question i=k?, k being said duration of said search period, if the answer to the preceding question is "no": waiting for the next receive instant, if the answer to the preceding question is "yes" and if an action conforms to said program, then performing that action, setting i=1, calculating D=D−Dm, calculating E=E−Em, setting am=aM, aM being a predetermined parameter at least equal to the largest value foreseeable for an offset associated with a receive instant, and waiting for the next receive instant.

9. The system claimed in claim 8, and further including an increment calculating unit for calculating said frequency increment, said unit being informed by said receiver and informing said local clock, said instruction to perform an action including the following instructions:

calculate A=A+am, A being a variable parameter having a zero value when the system is commissioned, answer the question IAI>S?, S being an absolute value common to said positive and negative offset thresholds, if the answer to the preceding question is "no": wait for the next receive instant, if the answer to the preceding question is "yes": answer the question A>S?, if the response to the preceding question is "no": calculate A=A+S, make the modification F=F+f, F being the frequency of said local clock and f being said frequency increment, each of said modifications being effected by control of said clock by said receiver with the aid of said increment calculating unit, inform said unit of the preceding modification, if the answer to the preceding question is "yes": calculate A=A−S, effect one of said modifications F=F−f, and inform said unit of the preceding modification.

10. The system claimed in claim 7 wherein said local clock includes a phase synchronization unit programmed to bring about provisional phase agreement of said local clock with a timebase external to said system by exchanging synchronization signals with said timebase via transmission means imposing constant transit delays on said signals.

11. A mobile telephone network including a plurality of base transceiver stations interconnected via an asynchronous transmission network, and wherein at least one of said base transceiver stations is a system as claimed in claim 7.

* * * * *